No. 712,563. Patented Nov. 4, 1902.
J. C. MATTHEWS.
MILKING MACHINE.
(Application filed Aug. 19, 1901. Renewed Apr. 7, 1902.)
(No Model.) 3 Sheets—Sheet 3.

WITNESSES,
K. M. Imboden,
R. W. Combs.

INVENTOR,
J. C. Matthews.
By Higdon & Higdon,
Att'ys.

THE NORRIS PETERS CO., PHOTO-LITHO., WASHINGTON, D. C.

UNITED STATES PATENT OFFICE.

JOHN C. MATTHEWS, OF BLUEMOUND, KANSAS.

MILKING-MACHINE.

SPECIFICATION forming part of Letters Patent No. 712,563, dated November 4, 1902.

Application filed August 19, 1901. Renewed April 7, 1902. Serial No. 101,632. (No model.)

*To all whom it may concern:*

Be it known that I, JOHN C. MATTHEWS, a citizen of the United States, and a resident of Bluemound, in the county of Linn and State of Kansas, have invented new and useful Improvements in Milking-Machines, of which the following is a specification.

My invention relates to devices for milking cows; and the object of my invention is to produce a milker of simple compact construction, reliable and positive in operation, and which can be sold at a low price and do better work than a high-priced apparatus.

My invention consists in the novel construction shown in the accompanying drawings, in which—

Figure 1:
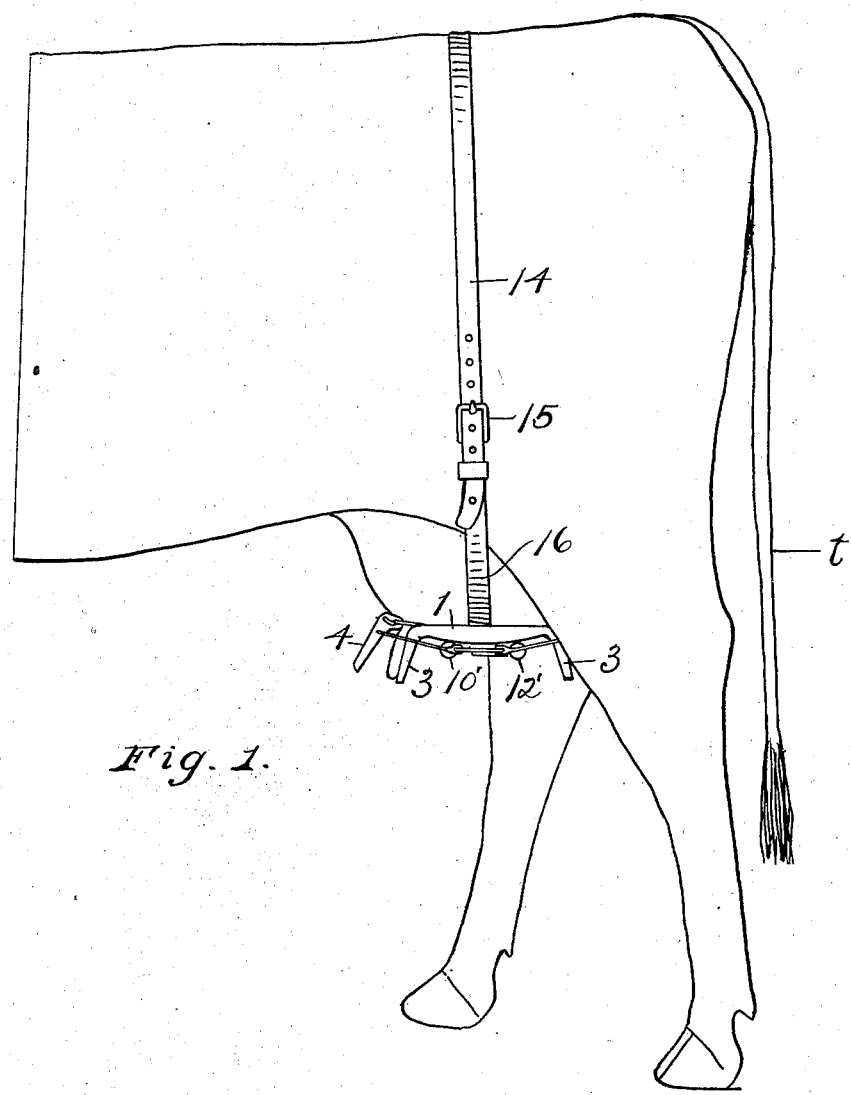
Figure 2:
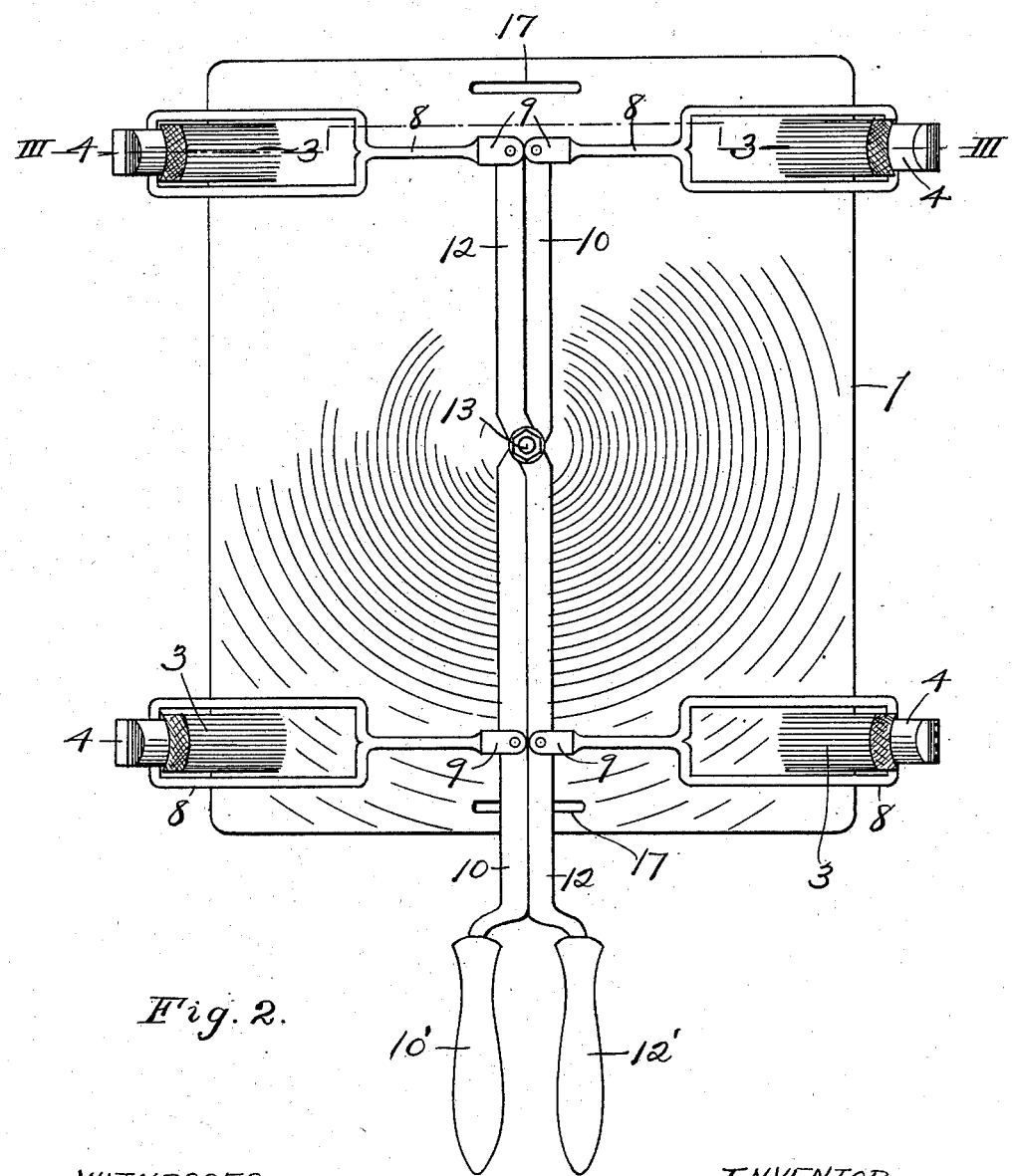
Figure 3:
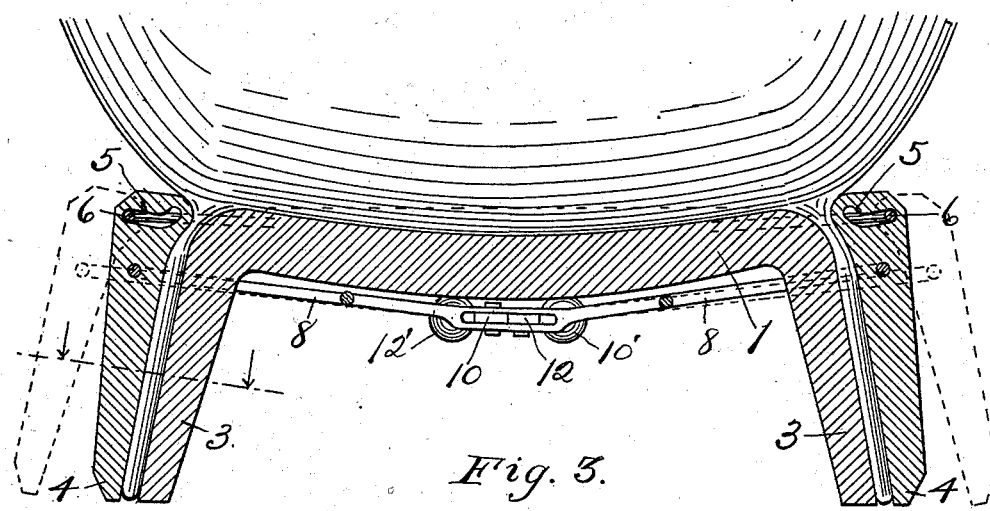
Figure 4:
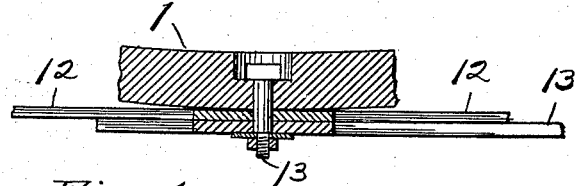
Figure 5:
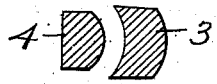
Figure 6:
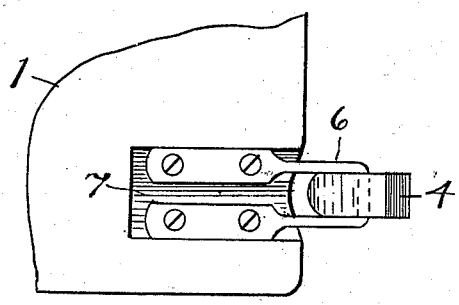

Figure 1 represents a milker embodying my invention attached to a cow. Fig. 2 is a bottom plan view of the milker detached from the animal. Fig. 3 is an irregular sectional view taken on line III III of Fig. 2, showing two of the teats. Fig. 4 is a broken-away sectional view of the operating-levers adjacent to their fulcrum. Fig. 5 is a transverse section taken on line V V of Fig. 3. Fig. 6 is a top view of one of the stirrups or guides supporting a milking-machine.

The frame of the milker comprises an udder-supporting plate 1, having a concave upper surface and a convex bottom, as shown, and having four obliquely-depending arms 3 at the respective corners thereof, said arms being preferably integral with the plate 1. Each arm 3 is concave on its outer face to receive one of the teats, the sectional shape of one of said arms and the adjacent milker being shown in Fig. 5. Each milker 4 is made of a tapering block of wood convex on its inner face to press the teat uniformly against the concave face of the corresponding arm 3. Cut in the upper end of each milker 4 is a slot 5, through which extends a support or stirrup 6, made of round metal rod, having its ends flattened and secured by screws in a recess 7 in the top of the plate 1, the purpose of the recess being to avoid the projecting of the stirrup 6 above the surface of said plate. (See Fig. 6.)

Referring to Figs. 2 and 3, passing through the respective milkers 4 a little below the slots 5 are four connecting-rods 8, made of round rod doubled back and welded together and having jaws 9, connected pivotally to the crossed operating-levers 10 12, which are fulcrumed on a bolt 13, passing through the plate 1. Oscillating said levers acts upon the milkers 4 through the connecting-rods 8 and causes the milkers to alternately approach and recede from the respective teat-supporting arms 3. It will be observed that the slots 5 in the milkers are curved upwardly at their inner ends. The object of thus shaping these slots is to decrease the frictional resistance between the milkers and their supports 6 at the beginning of the inward or pressing movement of the milkers. If said slots were straight, the pull on the milkers would not be parallel thereto, and thereby some unnecessary friction would be caused. When the rods 8 push the milkers 4 outwardly, the lower ends of the milkers are moved farther away from the teats than their upper ends, the motion of the upper ends being limited by the guides and stirrups 6 and the slots 5.

The plate 1 is supported by a strap 14, which is passed over the animal's back and is connected to a buckle 15, secured on the end of a short strap 16. The lower ends of said straps are secured in slots 17 in the plate 1 by any suitable means.

In attaching the machine to the cow the longer strap 14 is thrown over the animal's back and is buckled loosely to the other strap 16, and the teats are inserted between the milkers 4 and the concave arms 3, respectively, the levers 10 12 having first been moved apart to separate the milkers as far as possible from the arms 3. The straps are then tightened until the plate 1 bears with suitable pressure upon the udder.

The operation of milking consists merely in oscillating the levers 10 12 by means of the handles 10' 12'.

Having now fully described my invention, what I claim as new, and desire to secure by Letters Patent of the United States, is—

1. In a milking-machine, a plate adapted to be supported below the udder, a depending teat-support having a concave outer face, a milking-block arranged near said concave face, a transverse slot in the upper portion of said block, a guiding-stirrup extending through said slot and secured to said plate, an operating-lever pivotally secured to the bottom of said plate, and a rod connecting said lever to said milking-block at a point below said slot, substantially as described.

2. In a milking-machine, a plate having a concave upper surface and a convex bottom, means for supporting said plate beneath the udder, a plurality of teat-supports depending from said plate and having concave outer faces, milking-blocks adjacent to said concave faces, respectively, transverse slots in the upper portion of said blocks, respectively, guiding-stirrups extending through said slots, respectively, and secured to said plate, a pair of operating-levers having a common fulcrum secured to said plate, and a rod connecting each of said milking-blocks to one of said levers, said rods being connected to said blocks, a little below said slots therein, substantially as described.

3. In a milking-machine, a plate having a concave upper surface, a plurality of teat-supporting arms depending therefrom, a plurality of milking-blocks adjacent to the outer faces of said arms, respectively, openings in the upper ends of said blocks, respectively, guides extending through said openings and secured to said plate, and means for oscillating said milking-blocks toward and from said teat-supporting arms; substantially as described.

In testimony whereof I affix my signature in the presence of two witnesses.

JOHN C. MATTHEWS.

Witnesses:
W. S. ENGLE,
E. L. DEAN.